(12) United States Patent
Iyanaga et al.

(10) Patent No.: US 9,423,011 B2
(45) Date of Patent: Aug. 23, 2016

(54) VARIABLE VALVE TIMING CONTROL APPARATUS

(71) Applicant: AISIN SEIKI KABUSHIKI KAISHA, Kariya-shi (JP)

(72) Inventors: Hideomi Iyanaga, Anjo (JP); Masaki Kobayashi, Okazaki (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/332,903

(22) Filed: Jul. 16, 2014

(65) Prior Publication Data

US 2015/0033907 A1    Feb. 5, 2015

(30) Foreign Application Priority Data

Jul. 31, 2013    (JP) ................. 2013-159409

(51) Int. Cl.
 *F01L 1/34* (2006.01)
 *F16H 25/08* (2006.01)
 *F01L 1/344* (2006.01)

(52) U.S. Cl.
 CPC ............. *F16H 25/08* (2013.01); *F01L 1/3442* (2013.01); *Y10T 74/2106* (2015.01)

(58) Field of Classification Search
 CPC ... F01L 1/3442; F16H 25/08; Y10T 74/2106
 USPC .......................................... 123/90.15, 90.17
 See application file for complete search history.

(56) References Cited

U.S. PATENT DOCUMENTS 6,062,182 A    5/2000  Ogawa
6,244,230 B1   6/2001  Mikame (Continued)

FOREIGN PATENT DOCUMENTS

DE        19854891 A1    6/1999
DE   10 2007 056 683 A1    5/2009

(Continued)

OTHER PUBLICATIONS

The extended European Search Report issued on May 13, 2015, by the European Patent Office in corresponding European Application No. 14178223.5. (5 pages).

(Continued)

*Primary Examiner* — Ching Chang

(74) *Attorney, Agent, or Firm* — Buchanan Ingersoll & Rooney PC

(57) ABSTRACT

A variable valve timing control apparatus includes a driving-side rotation member rotating in synchronization with a crankshaft of an internal combustion engine, a driven-side rotation member integrally rotating with a camshaft of the internal combustion engine, an intermediate lock mechanism being selectively switchable between a locked state and an unlocked state, a plurality of hydraulic chambers, at least one of the plurality of hydraulic chambers being positioned at a lower side than an axis of the camshaft, a plurality of partition portions, each of the plurality of partition portions dividing each of the hydraulic chambers into an advanced angle chamber and a retarded angle chamber, an electromagnetic valve including a supply and discharge port that is positioned at an upper side than the axis of the camshaft and switching supply and discharge of fluid relative to the hydraulic chambers, and a pump supplying fluid to the electromagnetic valve.

3 Claims, 7 Drawing Sheets

(56) References Cited

U.S. PATENT DOCUMENTS

| | | | |
|---|---|---|---|
| 6,477,996 B2* | 11/2002 | Ogawa | 123/90.15 |
| 6,742,486 B2* | 6/2004 | Palesch et al. | 123/90.17 |
| 6,810,842 B2 | 11/2004 | Itou | |
| 6,860,247 B2 | 3/2005 | Asai et al. | |
| 7,395,802 B2 | 7/2008 | Riley et al. | |
| 8,640,662 B2* | 2/2014 | Cole et al. | 123/90.17 |
| 2003/0145814 A1 | 8/2003 | Inoue | |
| 2005/0252465 A1 | 11/2005 | Itou | |
| 2006/0112922 A1 | 6/2006 | Yoshijima et al. | |
| 2007/0113812 A1 | 5/2007 | Yoshijima et al. | |
| 2010/0313834 A1 | 12/2010 | Auchter et al. | |
| 2014/0048027 A1 | 2/2014 | Hoppe et al. | |

FOREIGN PATENT DOCUMENTS

| | | |
|---|---|---|
| DE | 10 2011 077 027 A1 | 12/2012 |
| EP | 0 937 865 A1 | 8/1999 |
| EP | 1 333 159 A2 | 8/2003 |
| EP | 1340886 A1 | 9/2003 |
| EP | 1422387 A1 | 5/2004 |
| EP | 1 662 097 A1 | 5/2006 |
| EP | 1865157 A1 | 12/2007 |
| EP | 1985813 A2 | 10/2008 |
| JP | 2011-256772 A | 12/2011 |
| WO | 2007/074612 A1 | 7/2007 |

OTHER PUBLICATIONS

European Search Report corresponding to European Application No. 14 178 223.5, issued Jan. 15, 2016; 3 pages.

Communication Pursuant to Article 94(3) EPC issued by the European Patent Office on Jun. 10, 2016 in corresponding European Patent Application No. 14 178 223.5-1606 (5 pages).

* cited by examiner

VARIABLE VALVE TIMING CONTROL APPARATUS

CROSS REFERENCE TO RELATED APPLICATIONS

This application is based on and claims priority under 35 U.S.C. §119 to Japanese Patent Application 2013-159409, filed on Jul. 31, 2013, the entire content of which is incorporated herein by reference.

TECHNICAL FIELD

This disclosure generally relates to a variable valve timing control apparatus.

BACKGROUND DISCUSSION

A known variable valve timing control apparatus for controlling a relative rotation phase of a driven-side rotation member relative to a driving-side rotation member that rotates in synchronization with a crankshaft of an internal combustion engine may include an intermediate lock mechanism. The intermediate lock mechanism is configured to lock the aforementioned relative rotation phase at an intermediate phase positioned in a range between a most retarded angle phase and a most advanced angle phase (i.e., the intermediate lock mechanism is in a locked state). Such variable valve timing control apparatus is disclosed in JP2011-256772A which will be hereinafter referred to as Reference 1. The variable valve timing control apparatus disclosed in Reference 1 includes the driven-side rotation member arranged to be coaxial with the driving-side rotation member and integrally rotating with a camshaft for opening and closing a valve of the internal combustion engine, fluid chambers defined between the driving-side rotation member and the driven-side rotation member, and partition portions provided at the driven-side rotation member, each of the partition portions dividing each of the fluid chambers into an advanced angle chamber and a retarded angle chamber. The driving-side rotation member is disposed to be sandwiched between a plate-formed sprocket and a plate-formed cover and tightened by bolts.

At a time when the engine is started or the engine is restarted from a failure state including an engine stall, for example, the intermediate lock mechanism may be in an unlocked state in which the locked state is released so that each of the partition portions is positioned in the vicinity of the most retarded angle phase or the most advanced angle phase. At this time, because the engine is started after once the engine is stopped, almost no oil exists in the fluid chambers. As a result, the camshaft repeatedly rotates in an advanced angle direction and a retarded angle direction by receiving a reaction force from an intake valve or an exhaust valve, which causes the partition portions provided at the driven-side rotation member to repeatedly and strongly make contact with side walls of the fluid chambers. A contact position between each of the partition portions and the side wall of each of the fluid chambers may be thus fluctuated, which may cause the most retarded angle phase and the most advanced angle phase to deviate from original phases that are specified beforehand.

Therefore, according to Reference 1, in order to avoid direct contact between the partition portions and the side walls of the fluid chambers, a first protrusion portion that protrudes in the retarded angle direction is formed at one of the partition portions while a second protrusion portion that protrudes in the advanced angle direction is formed at another one of the partition portions. In a case where the relative rotation phase reaches the most retarded angle phase, the first protrusion portion makes contact with one of the bolt while, in a case where the relative rotation phase reaches the most advanced angle phase, the second protrusion portion makes contact with another one of the bolts.

According to the aforementioned variable valve timing control apparatus, the first and second protrusion portions are formed at the partition portions, and also corresponding recess portions may be formed at the side walls of the fluid chambers so that the protrusion portions are fitted to the recess portions, which may lead to complicated configurations of the driving-side rotation member and the driven-side rotation member. In addition, because a contact area between the bolt in a bar form and the protrusion portion is relatively small, a contact portion of the protrusion portion relative to the bolt may be deformed and a tightening portion of the bolt may change or fluctuate by repeat contact between the bolt and the protrusion portion. The most retarded angle phase and the most advanced angle phase may still deviate from the respective phases that are specified beforehand.

Accordingly, in a case where each of the most retarded angle phase and the most advanced angle phase as a basis for controlling the relative rotation phase deviates or fluctuates, the relative rotation phase is not appropriately controlled.

A need thus exists for a variable valve timing control apparatus which is not susceptible to the drawback mentioned above.

SUMMARY

According to an aspect of this disclosure, a variable valve timing control apparatus includes a driving-side rotation member rotating in synchronization with a crankshaft of an internal combustion engine, a driven-side rotation member arranged to be coaxial with the driving-side rotation member and integrally rotating with a camshaft for opening and closing a valve of the internal combustion engine, an intermediate lock mechanism being selectively switchable between a locked state in which a relative rotation phase of the driven-side rotation member relative to the driving-side rotation member is locked at an intermediate lock phase between a most advanced angle phase and a most retarded angle phase and an unlocked state in which the locked state is released, a plurality of hydraulic chambers formed between the driving-side rotation member and the driven-side rotation member, at least one of the plurality of hydraulic chambers being positioned at a lower side than an axis of the camshaft, a plurality of partition portions provided at one of the driving-side rotation member and the driven-side rotation member, each of the plurality of partition portions dividing each of the hydraulic chambers into an advanced angle chamber and a retarded angle chamber, an electromagnetic valve including a supply and discharge port that is positioned at an upper side than the axis of the camshaft and switching supply and discharge of fluid relative to the hydraulic chambers, and a pump supplying fluid to the electromagnetic valve.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments will be explained below. The embodiments are not limited to include the configurations described below and may be appropriately changed or modified.

Figure 1:
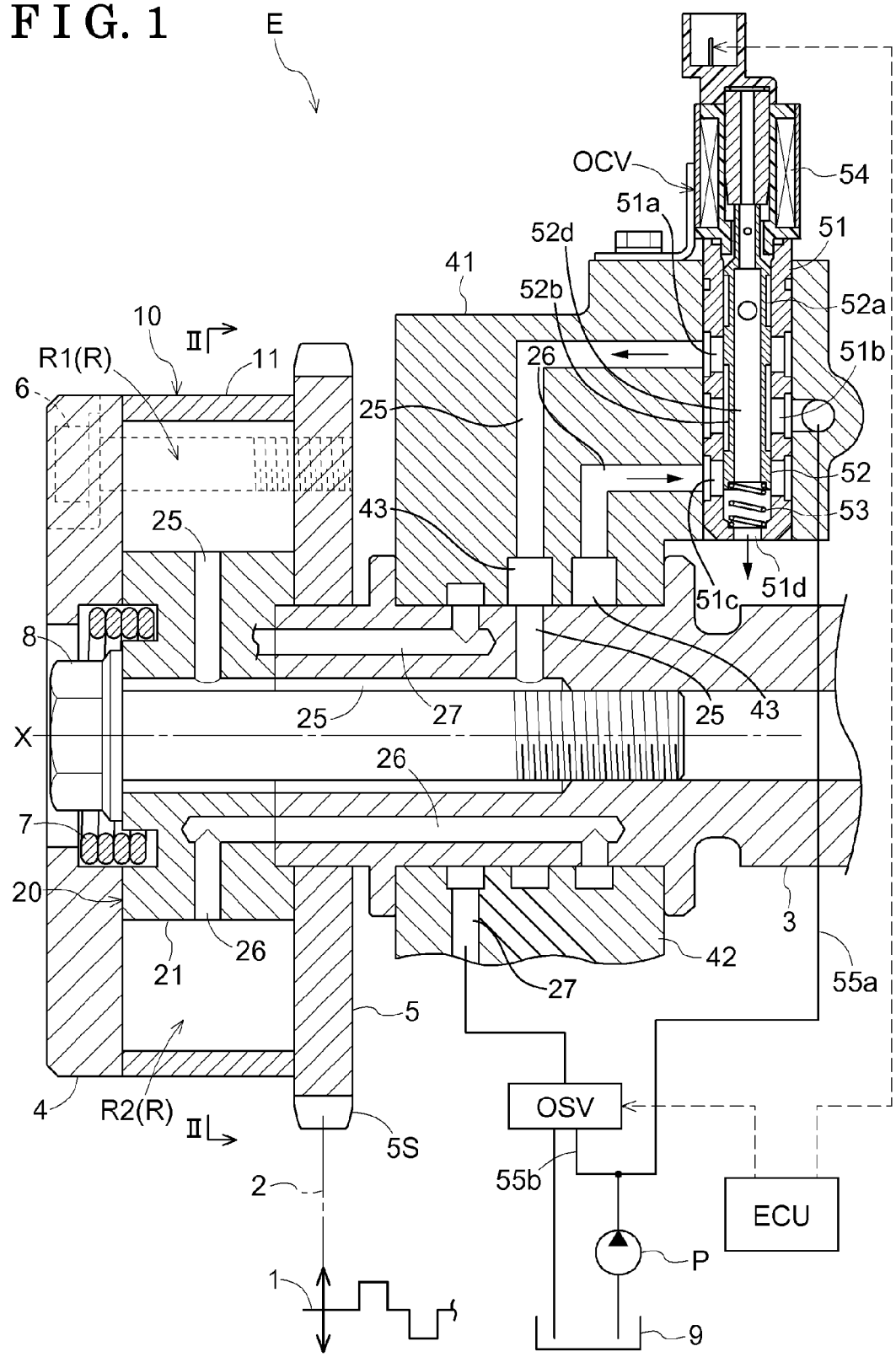
FIG. 1 is a cross-sectional side view schematically illustrating a variable valve timing control apparatus according to a first embodiment disclosed here.
Figure 2:
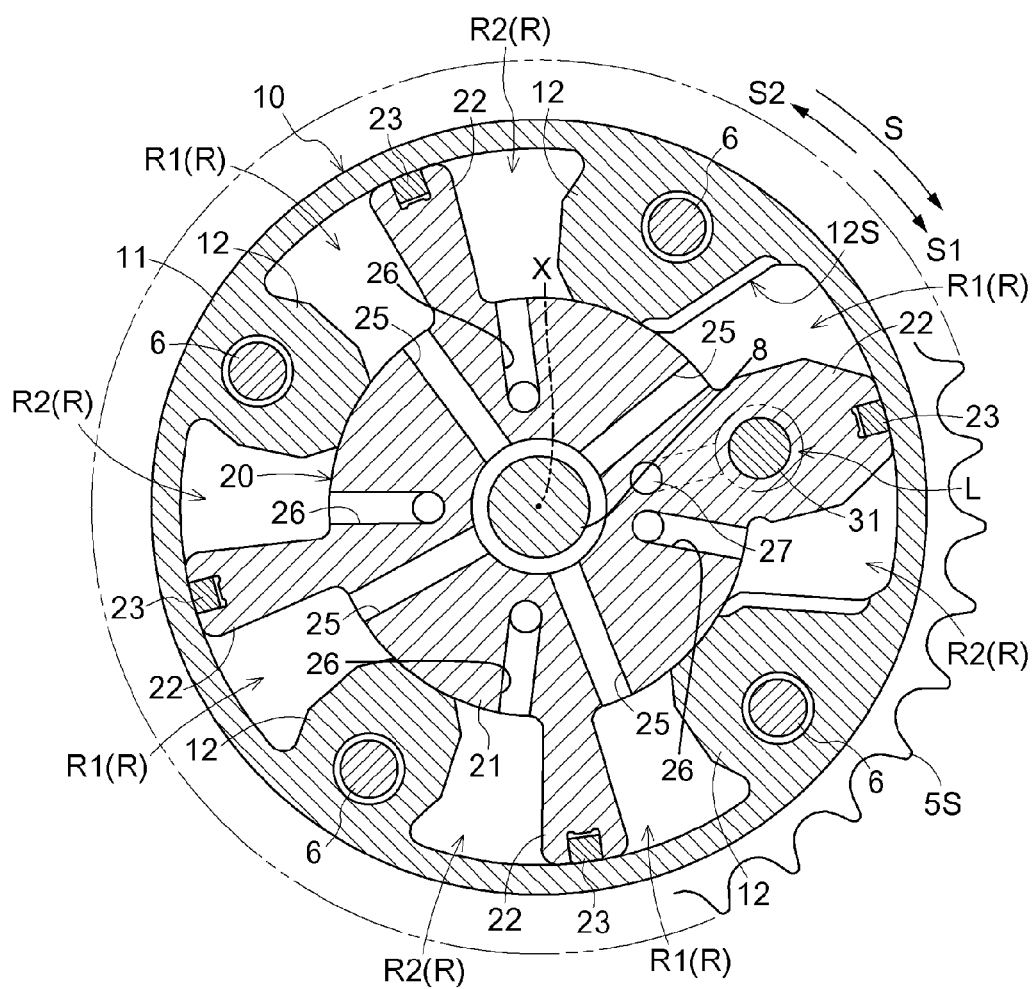
FIG. 2 is a cross-sectional view taken along line II-II in FIG. 1 and illustrating a locked state of an intermediate lock mechanism.
Figure 3:
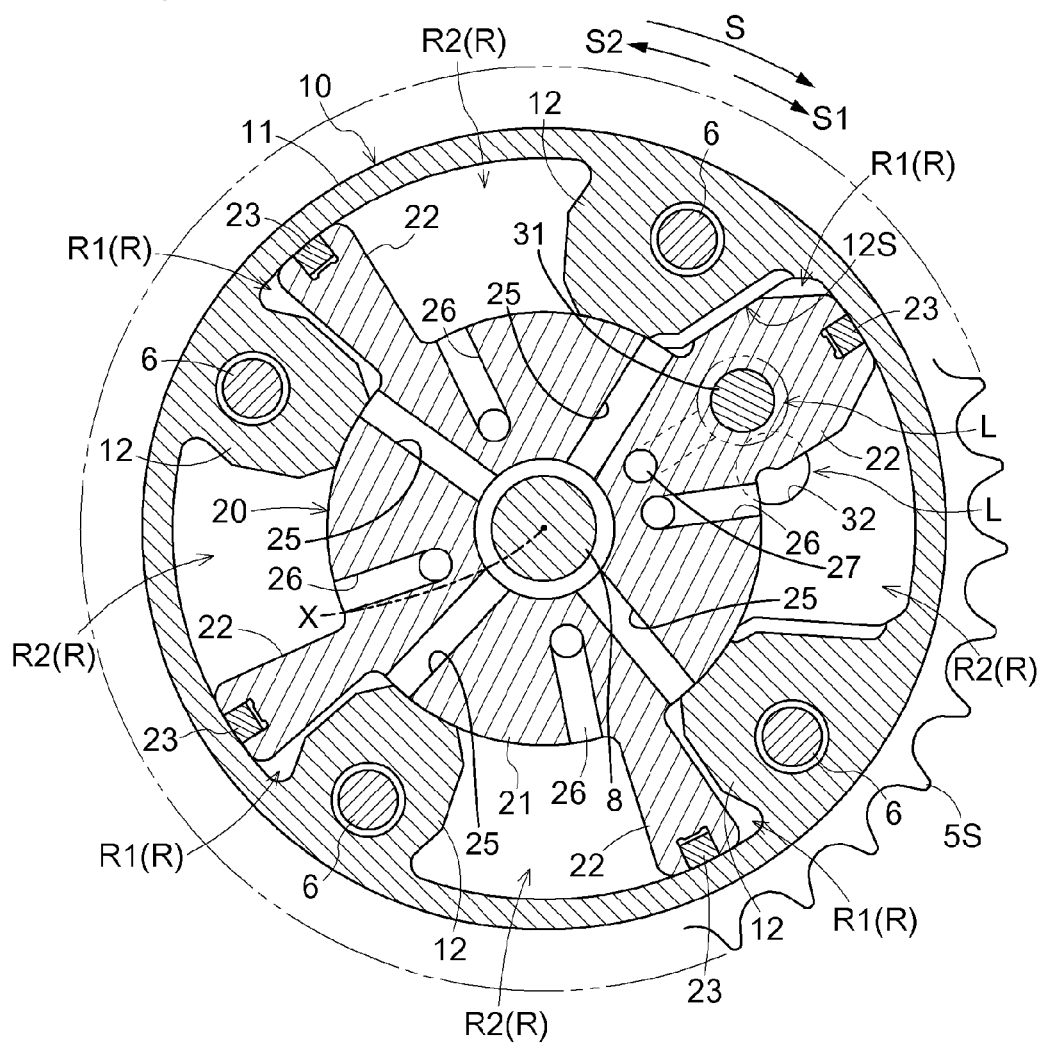
FIG. 3 is a cross-sectional view illustrating a relative rotation phase at a most retarded angle side in a case where an engine is started.

A first embodiment will be explained with reference to the attached drawings. As illustrated in FIGS. 1 and 2, a variable valve timing control apparatus according to the first embodiment includes an outer rotor 10 serving as a driving-side rotation member, an inner rotor 20 serving as a driven-side rotation member, and an intermediate lock mechanism L that locks a relative rotation between the outer rotor 10 and the inner rotor 20. The outer rotor 10 rotates in synchronization with a crankshaft 1 of an engine E serving as an internal combustion engine via a power transmission member 2. The inner rotor 20 is connected to a camshaft 3 for opening and closing an intake valve in a combustion chamber of the engine E. The inner rotor 20 is arranged to be coaxial with a rotation axis (an axis) X of the outer rotor 10 (which corresponds to an axis of the camshaft 30) so as to be rotatable relative to the outer rotor 10. The intermediate lock mechanism L is selectively switchable between a locked state in which a relative rotation phase of the inner rotor 20 relative to the outer rotor 10 is locked at an intermediate lock phase between a most retarded angle phase and a most advanced angle phase as illustrated in FIG. 2 and an unlocked state in which the locked state at the intermediate lock phase is released as illustrated in FIG. 3.

The outer rotor 10 and the inner rotor 20 are arranged and sandwiched between a front plate 4 that is disposed at a front position and a rear plate 5 that is disposed opposite from the front plate 4 (i.e., positioned at a side facing the engine E). Connection bolts 6 each of which serves as a tightening member penetrate through the outer rotor 10 from the front plate 4 to be threadedly engaged with the rear plate 5 so that the outer rotor 10 and the inner rotor 20 are connected to each other.

A sprocket 5S on which the power transmission member 2 formed by a timing chain, for example, is wound is integrally formed at an outer periphery of the rear plate 5. A torsion spring 7 is disposed between the front plate 4 and the inner rotor 20 so as to bias the inner rotor 20 in an advanced angle direction S1. A fixation bolt 8 that connects and fixes the inner rotor 20 to the camshaft 3 is arranged to be coaxial with the axis X. A portion of an advanced angle oil passage 25 is formed at an outer peripheral side of the fixation bolt 8.

As illustrated in FIG. 2, the outer rotor 10 in a cylindrical form includes plural division portions 12 projecting radially inwardly from an outer peripheral portion 11 so as to form four oil chambers R each of which serves as an example of a hydraulic chamber. The oil chambers R are formed in a dispersed manner in a state where each of the oil chambers R is disposed between the adjacent division portions 12. Therefore, even in a case where the outer rotor 10 rotates via the power transmission member 2, at least one of the oil chambers R is disposed at a lower side than the axis X of the camshaft 3. In the embodiment, the number of oil chambers R is four but the number is not limited to four and may be appropriately changed.

The inner rotor 20 includes plural vane portions 22 each of which serves as an example of a partition portion and protrudes radially outwardly from a body portion 21 in a column form. The plural oil chambers R are divided by the plural vanes 22. Specifically, each of the oil chambers R is divided into and formed by an advanced angle chamber R1 in a counterclockwise direction relative to the vane portion 22 and a retarded angle chamber R2 in a clockwise direction relative to the vane portion 22. In addition, the outer rotor 10 and the inner rotor 20 are relatively rotatable to each other within a range where the vane portion 22 is movable in the oil chamber R. The vane portions 22 may be formed at the outer rotor 10 while the division portions 12 may be formed at the inner rotor 20.

The outer rotor 10 is driven to rotate in a direction S in FIG. 2 by the power transmission member 2. In a case where oil serving as an example of operation fluid or fluid is supplied to the advanced angle chambers R1, the relative rotation phase of the inner rotor 20 relative to the outer rotor 10 is changed or shifted in the advanced angle direction S1. In a case where oil is supplied to the retarded angle chambers R2, the relative rotation phase of the inner rotor 20 relative to the outer rotor 10 is changed or shifted in a retarded angle direction S2. A seal 23 is provided at a projection end of each of the vane portions 22 so as to make contact with an inner peripheral surface of the outer rotor 10. A contact surface 12S is formed at the division portion 12 so as to make contact with the vane portion 22 in a case where the relative rotation phase is specified at the most retarded angle phase as illustrated in FIG. 3. A groove is formed so that oil from the advanced angle oil passage 25 is supplied to between the contact surface 12S and the vane portion 22 in a state where the division portion 12 and the vane portion 22 are in contact with each other. In the same way, a groove is formed so that oil from a retarded angle oil passage 26 is supplied to between a side surface of the division portion 12 and the vane portion 22 in a case where the relative rotation phase is specified at the most advanced angle phase.

As illustrated in FIGS. 2 and 3, the intermediate lock mechanism L includes a lock pin 31 serving as a lock member that is provided at one of the plural vane portions 22 formed at the inner rotor 20. The lock pin 31 is projectable and retractable along the axis X. The intermediate lock mechanism L also includes a lock recess portion 32 formed at the rear plate 5 so that the lock pin 31 engages with the lock recess portion 32, and a lock spring that biases the lock pin 31 in a direction where the lock pin 31 engages with the lock recess portion 32. In the present embodiment, the lock pin 31 is provided at the vane portion 22 formed in a block form. Alternatively, the lock pin 31 may be provided at the vane portion 22 formed in a plate form. In addition, the lock pin 31 may be formed at the division portion 12 while the lock recess portion 32 may be formed at the inner rotor 20, and the lock pin 31 may engage with the lock recess portion 32 in a direction orthogonal to the axis X. Further, two or more of the intermediate lock mechanisms L may be provided.

The intermediate lock phase is specified at a substantially center phase between the most retarded angle phase and the most advanced angle phase so that the engine E is operated with improved fuel efficiency. In a case where oil is supplied to the intermediate lock mechanism L after the engine E is started so that the intermediate lock mechanism L is brought to the unlocked state as the lock pin 31 is separated and removed from the lock recess portion 32, the relative rotation phase of the inner rotor 20 relative to the outer rotor 10 may be arbitrarily specified. In a case where the engine E is stopped, the relative rotation phase is changed to the intermediate lock phase and the lock pin 31 moves to the lock recess portion 32 by a biasing force of the lock spring, which leads to the locked state of the intermediate lock mechanism L.

As illustrated in FIG. 1, a supply and discharge port for advanced angle chamber (which will be hereinafter referred to as an advanced angle supply and discharge port) 51a and a supply and discharge port for retarded angle chamber (which will be hereinafter referred to as a retarded angle supply and discharge port) 51c are provided at an upper side than the axis X of the camshaft 3. A relative rotation valve serving as an oil control valve (which will be hereinafter referred to as an OCV) is formed to extend in a direction orthogonal to the axis X. The OCV is configured to choose either the advanced angle chambers R1 or the retarded angle chambers R2 to switch supply and discharge of oil relative to the corresponding chambers. In addition, an intermediate lock valve serving as an oil switching valve (which will be hereinafter referred to as an OSV) is formed along the axis X at a lower side than the axis X of the camshaft 3. The OSV controls supply and discharge of oil relative to the intermediate lock mechanism L. The OCV and the OSV are inserted to be positioned within a cam cap 41 and a cylinder head 42 each of which serves as a static member. The position of the OSV is not specified and the OSV may be arranged at a portion where the OSV does not interfere with the OCV or other members.

Each of the OCV and OSV serves as an electromagnetic valve. The OCV includes a spool 52 inserted to be positioned within a valve body 51, a spring 53 biasing the spool 52, and an electromagnetic solenoid 54 including a known configuration to drive the spool 52. The OSV also includes a spool, a spring, and an electromagnetic solenoid. In the embodiment, a hydraulic pump P serving as a single pump is provided to supply oil to the OCV and the OSV from an oil pan 9. The hydraulic pump P is not limited to a single pump and plural pumps may be provided to supply oil separately to the OCV and the OSV.

Each of the OCV and the OSV is controlled on a basis of a control signal from an engine control unit (ECU). The ECU specifies a target relative rotation phase based on a detection signal from a phase sensor for detecting the relative rotation phase between the outer rotor 10 and the inner rotor 20 and/or a speed sensor for detecting a rotation speed of the engine E, for example, and outputs the control signal to each of the OCV and the OSV.

According to the aforementioned control, the relative rotation phase of the inner rotor 20 relative to the outer rotor 10 is changed or shifted to thereby control an opening and closing timing of the intake valve that is controlled to open and close by the rotation of the camshaft 3.

As illustrated in FIG. 1, the spool 52 of the OCV includes a cylindrical form with a bottom, specifically, a lower portion of the spool 52 in a vertical direction corresponding to the orthogonal direction relative to the axis X is opened. A discharge groove for advanced angle chamber, which will be hereinafter referred to as an advanced angle discharge groove 52a, and an annular groove for supply, which will be hereinafter referred to as a supply annular groove 52b, are formed in parallel to each other as annular grooves at an outer periphery of the spool 52. The advanced angle supply and discharge port 51a, a supply port 51b, the retarded angle supply and discharge port 51c, and a discharge port 51d are formed at the valve body 51. The advanced angle supply and discharge port 51a is selectively connected or communicated to either the advanced angle discharge groove 52a or the supply annular groove 52b. The supply port 51b is connected to the supply annular groove 52b. The retarded angle supply and discharge port 51c is selectively connected to either the supply annular groove 52b or a void formed at a lower portion of the spool 52. The discharge port 51d is formed at a lower portion of the valve body 51 in the vertical direction. A discharge bore 52d is formed at the advanced angle discharge groove 52a of the spool 52 so that the advanced angle supply and discharge port 51a is connected to the discharge bore 52d. Oil is thus discharged to the outside via the discharge port 51d by flowing through a hollow inner portion of the spool 52. The retarded angle supply and discharge port 51c is directly connected to the discharge port 51d so that oil is discharged to the outside. The OSV is configured to perform supply and discharge of oil relative to the intermediate lock mechanism L.

Oil suctioned by the hydraulic pump P from the oil pan 9 is diverged to a supply oil passage for OCV (which will be hereinafter referred to as an OCV supply oil passage 55a) and a supply oil passage for OSV (which will be hereinafter referred to as an OSV supply oil passage 55b) and supplied to the OCV and the OSV respectively.

As illustrated in FIG. 2, the advanced angle oil passage 25 connected to the advanced angle chambers R1, the retarded angle oil passage 26 connected to the retarded angle chambers R2, and a lock release oil passage 27 are formed at the inner rotor 20. As illustrated in FIG. 1, the aforementioned oil passages 25, 26, and 27 are connected to an oil passage formed at an inner portion of the camshaft 3 and connected to the OCV and the OSV from an outer surface of the camshaft 3. In addition, recess portions 43 each of which serves as a half-annular void and an example of a fluid reservoir portion are formed at the cam cap 41 in a connection portion between the camshaft 3 and the cam cap 41. The recess portions 43, which include a function for storing oil, are disposed at a lower side than the advanced angle supply and discharge port 51a and the retarded angle supply and discharge port 51c and at an upper side than the axis X of the camshaft 3. The recess portions 43 may be formed at the camshaft 3 in the connection portion between the camshaft 3 and the cam cap 41.

At timing when the locked state of the intermediate lock mechanism L is released, an oil pressure may not be sufficiently applied to the advanced angle chambers R1 for changing the relative rotation phase. Alternatively, in a case where the engine E is stopped in the unlocked state of the intermediate lock mechanism L (i.e., failure state such as engine stall, for example), the oil pressure for shifting the intermediate lock mechanism L to the locked state is unable to be supplied in the early stage of restart of the engine E. Under such circumstances, the vane portions 22 greatly move or swing in the retarded angle direction relative to the axis X by a reaction force received by the camshaft 3 from a valve spring of the intake valve and acting in an opposite direction from the rotation direction S. Therefore, in a case where the relative rotation phase is at the most retarded angle side as illustrated in FIG. 3, the vane portion 22 may repeatedly and strongly make contact with the contact surface 12S of the division portion 12. As a result, deformation of the vane portion 22 and position error or deviation of the division portion 12 may occur. Such incident may also occur in a state where the relative rotation phase is at the most advanced angle side. Because the vane portions 22 that greatly move or swing in the retarded angle direction and the torsion spring 7 that biases the vane portions 22 (the inner rotor 20) in the advanced angle direction attempt to achieve a balance, each of the vane portions 22 moves unstably, i.e., moves in a reciprocating manner, to thereby repeatedly and strongly make contact with the side surface of the division portion 12.

In a case where the engine E is stopped, the hydraulic pump P is also stopped. Thus, a pressure from the hydraulic pump P is inhibited from being applied to oil that remains at the advanced angle oil passage 25 and the retarded angle oil passage 26. Oil is simply discharged by its own weight to the outside. In the present embodiment, the advanced angle supply and discharge port 51a and the retarded angle supply and discharge port 51c of the OCV are provided at the upper side than the axis X of the camshaft 3. Thus, the OCV is disposed at the upper side than at least one of the oil chambers R. That is, some of oil that remains at the advanced angle oil passage 25 and the retarded angle oil passage 26 is inhibited from being discharged because of hydraulic head difference between the OCV and at least one of the oil chambers R. As a result, oil is returned to the advanced angle chambers R1 and the retarded angle chambers R2 to remain thereat. In a case where the vane portion 22 moves in a direction to make contact with the contact surface 12S of the division portion 12 at the start of the engine E, oil disposed between the vane portion 22 and the contact surface 12S functions as a damper. Thereafter, because the oil pressure for shifting the relative rotation phase is sufficiently supplied to the oil chambers R after an elapse of certain amount of time, the repeat contact between the vane portion 22 and the contact surface 12S of the division portion 12 is further securely inhibited. Accordingly, oil remains at the oil chambers R until sufficient oil pressure is applied to the oil chambers R from the engine start so as to restrain the contact between the vane portions 22 and the division portions 12.

In addition, in the present embodiment, the recess portion 43 is formed at a substantially halfway portion of each of the advanced angle oil passage 25 and the retarded angle oil passage 26, which secures a large amount of oil to return to the oil chambers R. In order to securely return oil stored at the recess portions 43 to the oil chambers R, the recess portions 43 may be desirably formed closer to the oil chambers R relative to an uppermost portion of each of the advanced angle oil passage 25 and the retarded angle oil passage 26.

In a case where an electric power is not supplied to the electromagnetic solenoid 54 of the OCV, the spool 52 is held in a first operation state as illustrated in FIG. 1 by a biasing force of the spring 53. In the first operation state, the advanced angle supply and discharge port 51a and the supply port 51b are connected to each other. In addition, the retarded angle supply and discharge port 51c and the discharge port 51d are connected to each other. That is, in the first operation state of the OCV, oil is supplied to the advanced angle chambers R1 and oil at the retarded angle chambers R2 is discharged to the outside.

Figure 4:
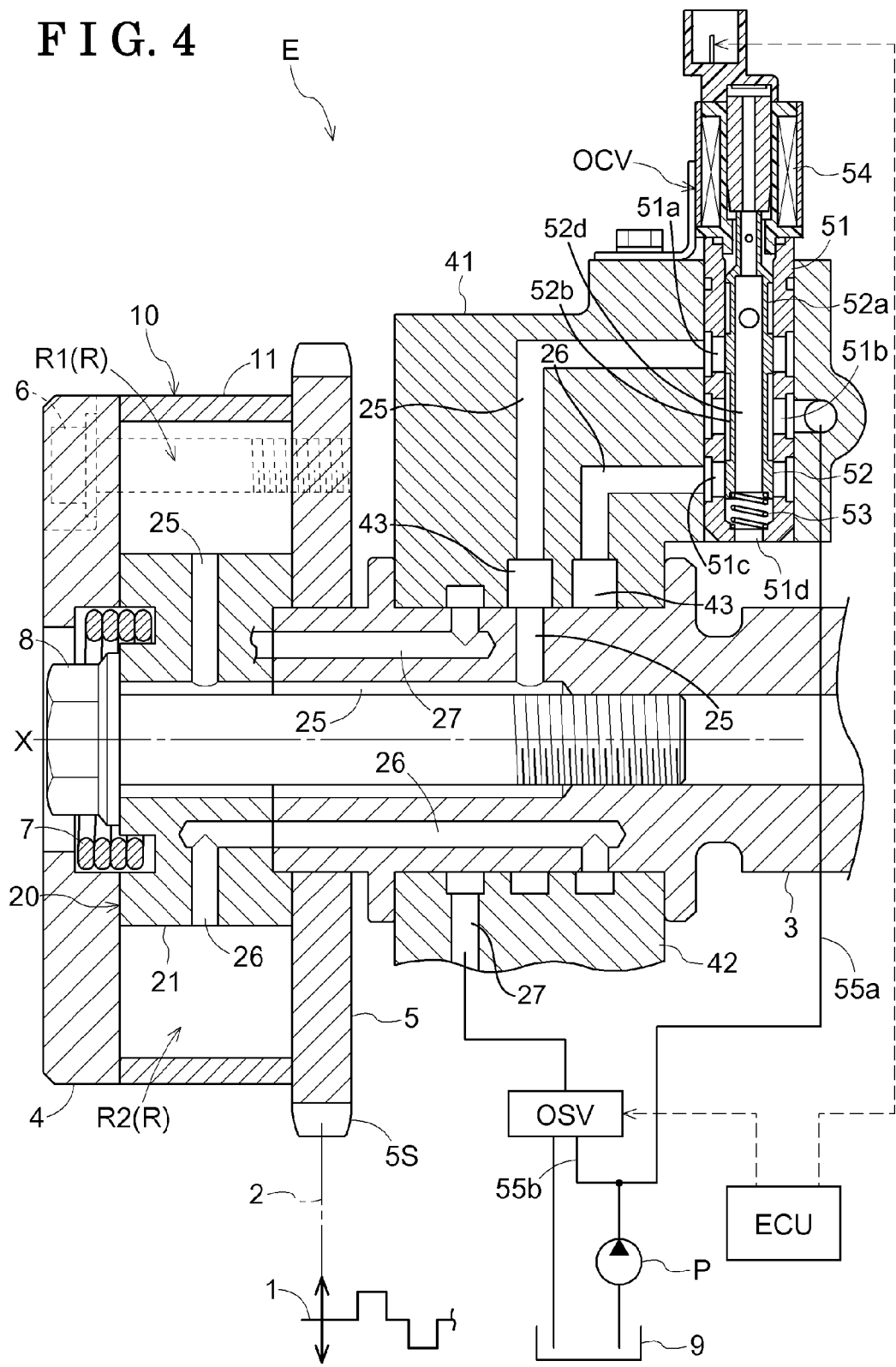
FIG. 4 is a cross-sectional side view illustrating a second operation state of an OCV.

In a case where a predetermined level of power is supplied to the electromagnetic solenoid 54, the spool 52 moves by a magnetic force of the electromagnetic solenoid 54 to be held in a second operation state as illustrated in FIG. 4. In the second operation state, the advanced angle supply and discharge port 51a and the retarded angle supply and discharge port 51c are both inhibited from being connected to the annular grooves (52a and 52b) and thus are blocked. That is, in the second operation state of the OCV, supply and discharge of oil relative to the advanced angle chambers R1 and the retarded angle chambers R2 are interrupted.

Figure 5:
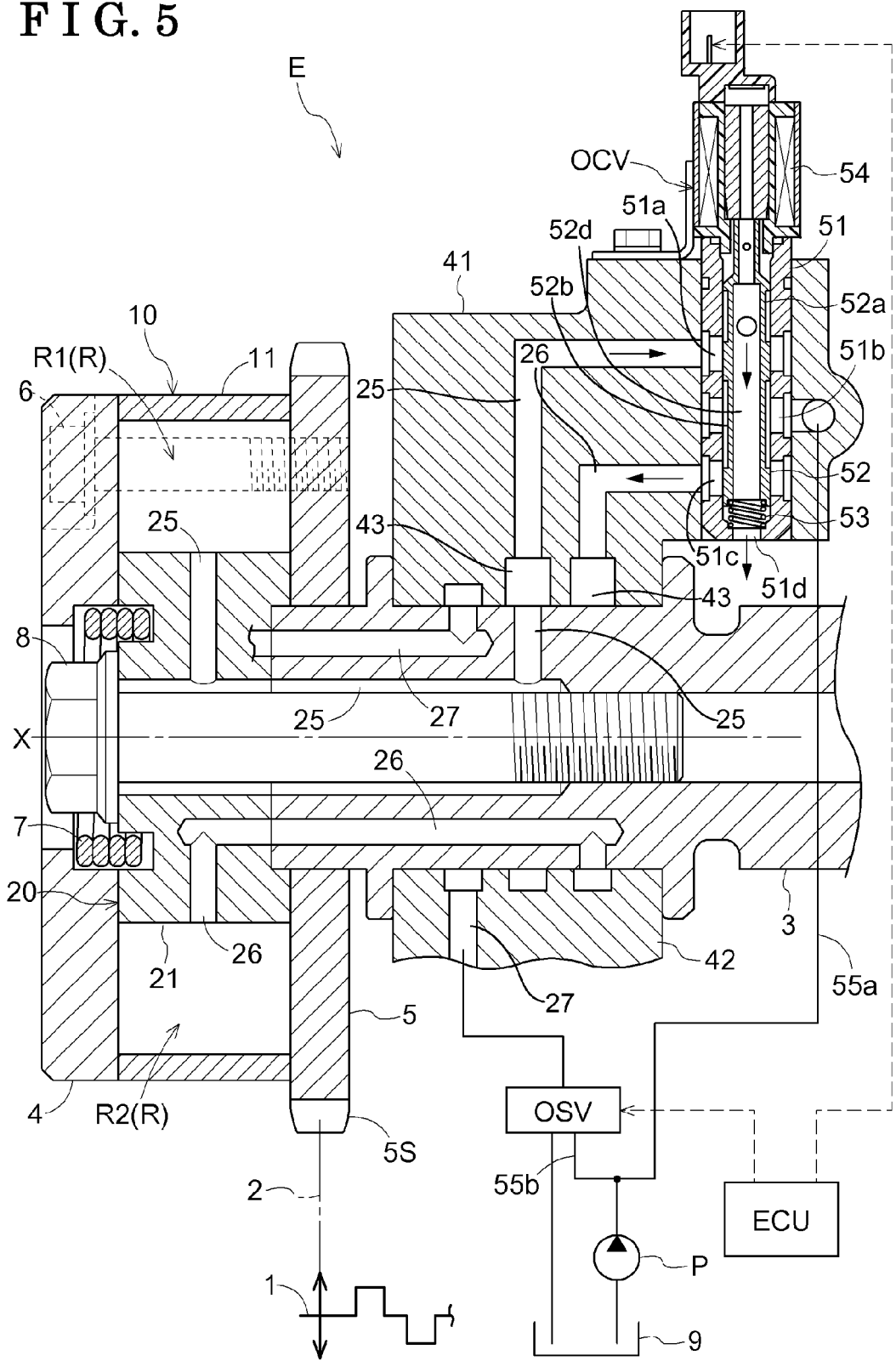
FIG. 5 is a cross-sectional side view illustrating a third operation state of the OCV.

In a case where a maximum power is supplied to the electromagnetic solenoid 54, the spool 52 further moves by the electromagnetic force of the electromagnetic solenoid 54 so as to be held in a third operation state as illustrated in FIG. 5. In the third operation state, the advanced angle supply and discharge port 51a and the discharge port 51d are connected to each other and the retarded angle supply and discharge port 51c and the supply port 51b are connected to each other. That is, in the third operation state of the OCV, oil at the advanced angle chambers R1 is released and oil is supplied to the retarded angle chambers R2.

In the variable valve timing control apparatus of the present embodiment, in a case where the engine E is operated, the OCV is controlled among in the first, second and third operation states so as to obtain appropriate fuel efficiency depending on a load state and a speed of the engine E. On the other hand, in a state where the engine E is stopped, the hydraulic pump P is stopped and the power supply to the OCV is terminated so that the OCV is retained in the first operation state. At this time, the advanced angle chambers R1 are connected to the supply port 51b of the OCV while the retarded angle chambers R2 are connected the discharge port 51d of the OCV. In the aforementioned state, in a case where oil remains at the OCV supply oil passage 55a between the hydraulic pump P and the OCV, oil at the advanced angle oil passage 25 may be pulled back to the OCV because of viscosity of oil at the OCV supply oil passage 55a. In this case, oil is inhibited from remaining at the advanced angle chambers R1 at the start of the engine E. In a case where the vane portion 22 moves in the direction to make contact with the contact surface 12S of the division portion 12, a desired damper effect cannot be exercised.

Therefore, in the present embodiment, after the stop of the engine E, the predetermined level of power is supplied to the OCV for a predetermined time period to hold the OCV in the second operation state so that the advanced angle supply and discharge port 51a and the retarded angle supply and discharge port 51c are blocked. That is, the communication between the advanced angle oil passage 25 and the OCV supply oil passage 55a is interrupted to inhibit oil at the advanced angle oil passage 25 from being pulled back to the OCV. In addition, oil at the OCV supply oil passage 55a is discharged to the oil pan 9 by its own weight. As a result, air enters the OCV supply oil passage 55a where substantially no oil exits. Afterwards, even when the power supply to the OCV is stopped, oil at the advanced angle oil passage 25 is inhibited from being discharged because of hydraulic head difference between the OCV and at least one of the oil chambers R. Until sufficient oil pressure is supplied to the oil chambers R from the engine start, oil that remains at the oil chambers R may restrain the contact between the vane portions 22 and the division portions 12.

A time period during which oil at the OCV supply oil passage 55a is discharged to the oil pan 9 depends on temperature of oil. Thus, a time period during which the predetermined level of power is supplied to the OCV may be specified so that oil at the OCV supply oil passage 55a is eliminated, specifically, reduced down to a substantially upper position of the axis X of the camshaft 3. The configuration of the OCV is not limited to the above and may be appropriately changed, for example, the first operation state and the third operation state may be reversed. Any electromagnetic valve may be acceptable as long as the first operation state, the second operation state, and the third operation state are obtained and controlled.

Figure 6:
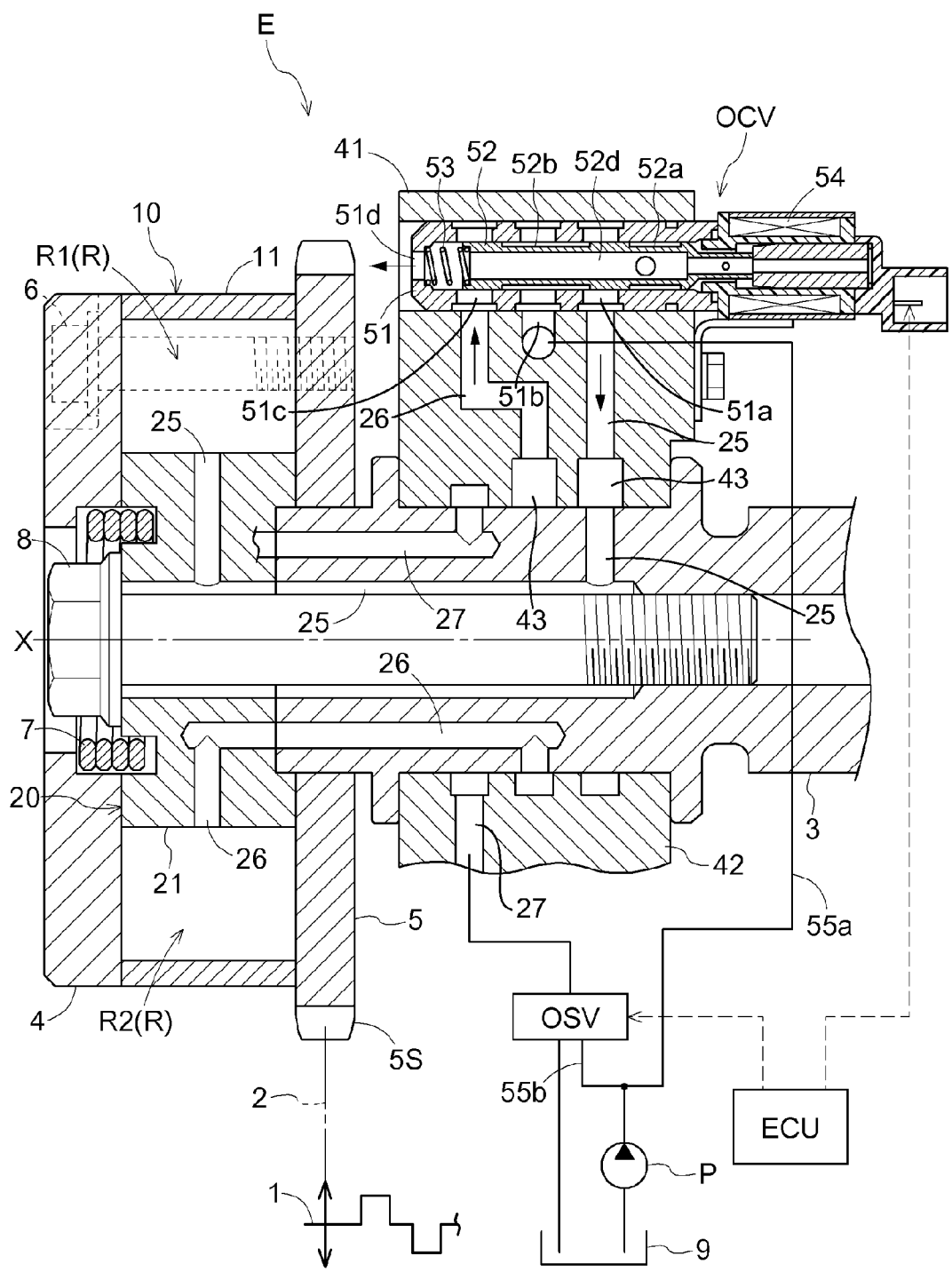
FIG. 6 is a cross-sectional side view schematically illustrating the variable valve timing control apparatus according to a second embodiment disclosed here.

A second embodiment will be explained next. A different configuration of the second embodiment from the first embodiment is explained with reference to FIG. 6. The same components and members in the second embodiment as those of the first embodiment bear the same reference numerals as the first embodiment.

In the second embodiment, the advanced angle supply and discharge port 51a and the retarded angle supply and discharge port 51c are positioned at the upper side than all of the oil chambers R. Thus, oil may remain at all of the oil chambers R by hydraulic head difference between the OCV and each of the oil chambers R. As compared to a case where oil remains at only the oil chamber R that is positioned at the lower side than the axis X as in the first embodiment, the damper effect of oil may be obtained at all of the oil chambers R in the second embodiment. Therefore, the contact between the vane portions 22 and the division portions 12 may be further restrained.

In addition, even though the advanced angle supply and discharge port 51a and the retarded angle supply and discharge port 51c are provided at the upper side than all the oil chambers R, the OCV is arranged along the axis X, which may reduce size of the camshaft 3 in a shaft radial direction. Further, the OSV may be efficiently disposed at a space between the OCV and the camshaft 3.

Figure 7:
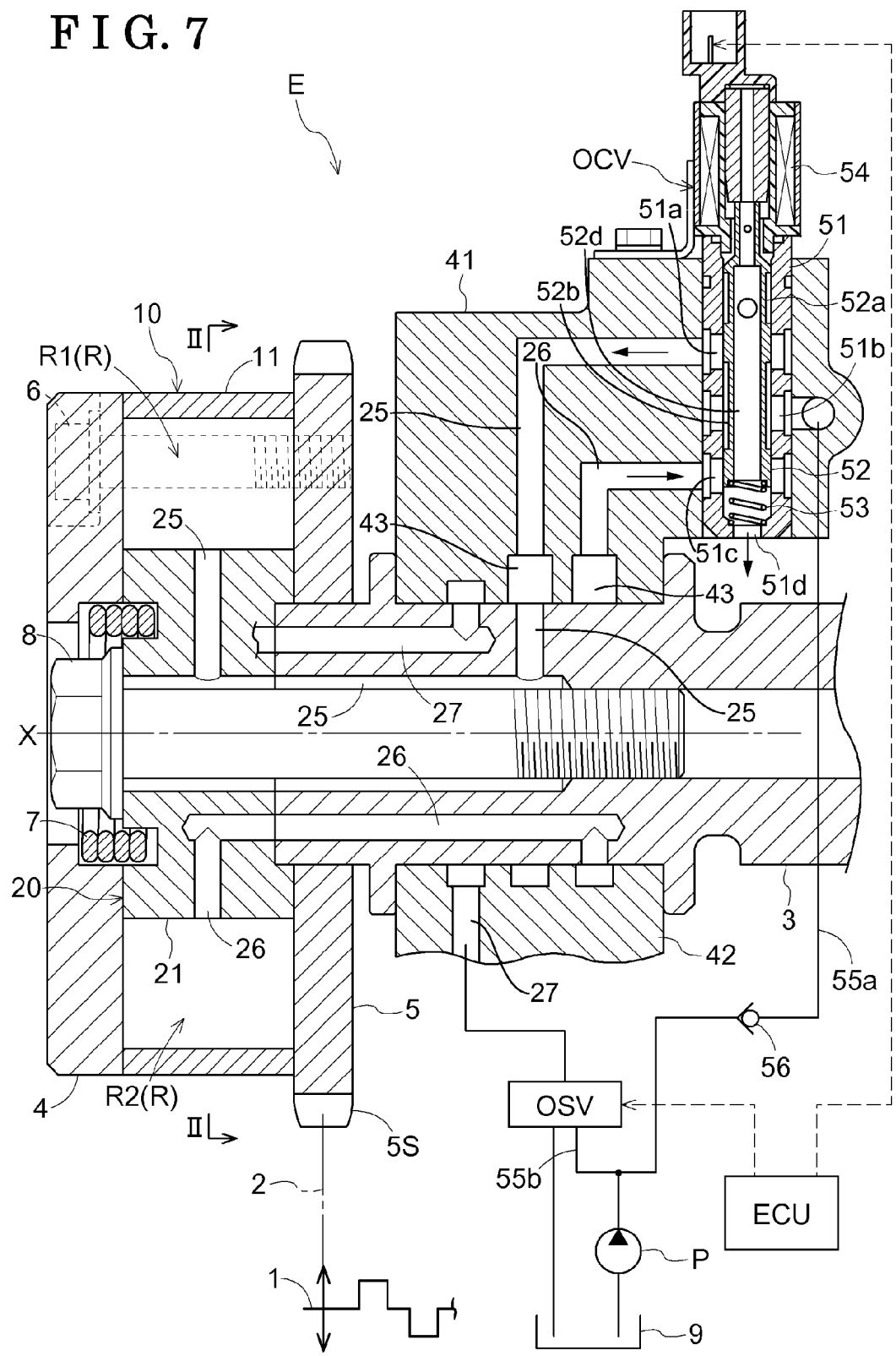
FIG. 7 is a cross-sectional side view schematically illustrating the variable valve timing control apparatus according to a third embodiment disclosed here.

A third embodiment will be explained with reference to FIG. 7. A different configuration of the third embodiment from the first embodiment will be explained. The same components and members in the third embodiment as those of the first embodiment bear the same reference numerals as the first embodiment.

In the third embodiment, a known check valve, i.e., a check valve 56, is provided at the OCV supply oil passage 55a from the hydraulic pump P to the OCV for allowing supply of oil from the hydraulic pump P to the OCV and prohibiting discharge of oil from the OCV to the hydraulic pump P. As explained in the first embodiment, in a case where oil remains at the OCV supply oil passage 55a, oil at the advanced angle oil passage 25 may be pulled back to the OCV because of viscosity of oil at the OCV supply oil passage 55a. Nevertheless, in a case where the engine E is stopped, the check valve 56 prohibits oil at the advanced angle oil passage 25 from being discharged to the oil pan 9 via the hydraulic pump P. Thus, oil may remain between the OCV and the oil chambers R by hydraulic head difference between the OCV and the oil chamber R.

The check valve 56 may be provided at a common supply oil passage from the hydraulic pump P to a portion before the OCV supply oil passage 55a and the OSV supply oil passage 55b.

The variable valve timing control apparatus in the aforementioned embodiments may be configured to control an opening and closing timing of not only an intake valve but also an exhaust valve. In addition, in the embodiments, after the stop of the engine E, the electromagnetic solenoid 54 is powered to block the advanced angle supply and discharge port 51a and the retarded angle supply and discharge port 51c for the predetermined time period. Nevertheless, such control for blocking the advanced angle supply and discharge port 51a and the retarded angle supply and discharge port 51c is not necessary. Even in this case, because of hydraulic head difference between the OCV and the oil chamber R, oil may remain at the advanced angle oil passage 25 and the retarded angle oil passage 26 in some degree. Further, in a case where the electromagnetic solenoid 54 is not powered, the OCV may block the advanced angle supply and discharge port 51a and the retarded angle supply and discharge port 51c. Furthermore, in a case where the electromagnetic solenoid 54 is not powered, the retarded angle chambers R2 and the OCV supply oil passage 55a may be connected to remain oil only at the advanced angle oil passage 25. In this case, because oil securely remains at the advanced angle chambers R1, an influence caused by the vane portions 22 greatly moving or swinging in the retarded angle direction by a reaction force received by the camshaft 3 may be specifically reduced. Furthermore, in the embodiments, the recess portions 43 serving as the fluid reservoir portions are formed at the connection portion between the camshaft 3 and the cam cap 41. At this time, the recess portions 43 may be formed at other portion than the connection portion. In the embodiments, the recess portions 43 are formed at the respective halfway portions of the advanced angle oil passage 25 and the retarded angle oil passage 26. Alternatively, the recess portion 43 may be formed at either the advanced angle oil passage 25 or the retarded angle oil passage 26, or the recess portion 43 may not be provided.

The embodiments are applicable to a variable valve timing control apparatus of an internal combustion engine for an automobile or the like, for example.

According to the aforementioned embodiments, at the start of the engine E or the restart of the engine E from a failure state such as an engine stall, for example, the relative rotation phase is inhibited from being locked at the intermediate lock phase in a case where the relative rotation phase is arranged in the vicinity of the most retarded angle phase or the most advanced angle phase. Thus, the camshaft 3 moves or swings by receiving a reaction force from an intake valve or an exhaust valve so that the vane portions 22 repeatedly and strongly make contact with the side walls of the oil chambers R.

According to the embodiments, the advanced angle supply and discharge port 51a and the retarded angle supply and discharge port 51c of the OCV for supply and discharge oil relative to the oil chambers R are positioned at the upper side than the center (i.e., the axis X) of the camshaft 3. Thus, at least one of the oil chambers R is positioned at the lower side than the advanced angle supply and discharge port 51a and the retarded angle supply and discharge port 51c of the OCV. That is, at the stop of the engine E, oil in the oil chambers R is likely to remain between the oil chambers R and the advanced angle supply and discharge port 51a and the retarded angle supply and discharge port 51c of the OCV because of hydraulic head difference between the OCV and at least one of the oil chambers R, and oil is not completely discharged. That is, even in a state where a discharge pressure of the hydraulic pump P is low when the engine E is restarted form a failure state, for example, oil may remain at at least one of the oil chambers R. In a case where the camshaft 3 rotates or swings, oil at the oil chamber R functions as damper to inhibit a direct contact between the vane portions 22 and the side walls of the oil chambers R at the most advanced angle side or the most retarded angle side. Accordingly, without complication of configurations of the inner rotor 20 and the outer rotor 10, a phase fluctuation of the most advanced angle or the most retarded angle as a basis for the relative rotation phase may be inhibited.

In the second embodiment, the advanced angle supply and discharge port 51a and the retarded angle supply and discharge port 51c are positioned at the upper side than all of the oil chambers R.

Accordingly, oil is likely to remain at all of the oil chambers R. Thus, oil disposed between the vane portions 22 and the side walls of the oil chambers R remain in dispersed manner, which may further enhance the damper effect. The direct contact between the vane portions 22 and the side walls of the oil chambers R may be further inhibited.

In addition, in the embodiments, the variable valve timing control apparatus further includes the recess portions 43 that store fluid, the recess portions 43 being positioned at the lower side than the advanced angle supply and discharge port 51a and the retarded angle supply and discharge port 51c and at the upper side than the axis X of the camshaft 3.

In a case where the engine E is stopped, a large volume of oil that remains between the oil chambers R and the advanced angle supply and discharge port 51a and the retarded angle supply and discharge port 51c of the OCV is stored by the recess portions 43. That is, at the start of the engine E, a large volume of oil is pulled back to the oil chambers R by hydraulic head difference between the recess portions 43 and at least one of the oil chambers R. Thus, the damper effect is enhanced by a large volume of oil to securely inhibit the direct contact between the vane portions 22 and the side walls of the oil chambers R. The recess portions 43 may be formed at the connection portion between the camshaft 3 and the cam cap 41 on the oil passage from the OCV to the oil chambers R. The inner rotor 20 and the outer rotor 10 are configured without complication accordingly.

In the embodiments, the OCV blocks the advanced angle supply and discharge port 51a and the retarded angle supply and discharge port 51c for the predetermined time period in a case where the engine E is stopped.

In a case where the engine E is stopped, oil that remains between the oil chambers R and the advanced angle supply and discharge port 51a and the retarded angle supply and discharge port 51c of the OCV may be pulled back to the OCV by oil viscosity in association with returning of oil that remains between the OCV and the hydraulic pump P to the hydraulic pump P, and may be discharged to the outside. In the embodiments, the advanced angle supply and discharge port 51a and the retarded angle supply and discharge port 51c are blocked for the predetermined time period. Thus, while oil that exists between the OCV and the hydraulic pump P is being discharged to the outside by its own weight, oil positioned closer to the oil chambers R relative to the OCV may be retained within the oil passage. Oil that exists between the oil chambers R and the advanced angle supply and discharge port 51a and the retarded angle supply and discharge port 51c of the OCV may securely remain to thereby inhibit the direct contact between the vane portions 22 and the side walls of the oil chambers R.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A variable valve timing control apparatus comprising:
a driving-side rotation member rotating in synchronization with a crankshaft of an internal combustion engine;
a driven-side rotation member arranged to be coaxial with the driving-side rotation member and integrally rotating with a camshaft for opening and closing a valve of the internal combustion engine;
an intermediate lock mechanism being selectively switchable between a locked state in which a relative rotation phase of the driven-side rotation member relative to the driving-side rotation member is locked at an intermediate lock phase between a most advanced angle phase and a most retarded angle phase and an unlocked state in which the locked state is released;
a plurality of hydraulic chambers formed between the driving-side rotation member and the driven-side rotation member, at least one of the plurality of hydraulic chambers being positioned at a lower side than an axis of the camshaft;
a plurality of partition portions provided at one of the driving-side rotation member and the driven-side rotation member, each of the plurality of partition portions dividing each of the hydraulic chambers into an advanced angle chamber and a retarded angle chamber;
an electromagnetic valve including a supply and discharge port that is positioned at an upper side of the axis of the camshaft and switching supply and discharge of fluid relative to the hydraulic chambers;
a cam cap above the axis of the camshaft, the fixing member fixing a position of the electromagnetic valve;
a liquid reservoir portion that stores the fluid, the liquid reservoir portion being formed in the cam cap, the liquid reservoir portion being located above the axis of the camshaft and lower than the supply and discharge port; and
a pump supplying fluid to the electromagnetic valve.

2. The variable valve timing control apparatus according to claim 1, wherein the supply and discharge port is positioned at an upper side than all of the hydraulic chambers.

3. The variable valve timing control apparatus according to claim 1, wherein the electromagnetic valve blocks the supply and discharge port for a predetermined time period in a case where the internal combustion engine is stopped.

* * * * *